United States Patent
Mundra

(10) Patent No.: US 12,212,667 B2
(45) Date of Patent: Jan. 28, 2025

(54) DELETING STALE OR UNUSED KEYS TO GUARANTEE ZERO PACKET LOSS

(71) Applicant: Juniper Networks, Inc., Sunnyvale, CA (US)

(72) Inventor: Sumeet Mundra, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 249 days.

(21) Appl. No.: 17/662,481

(22) Filed: May 9, 2022

(65) Prior Publication Data
US 2023/0361992 A1 Nov. 9, 2023

(51) Int. Cl.
*H04L 29/00* (2006.01)
*H04L 9/08* (2006.01)
*H04L 9/40* (2022.01)

(52) U.S. Cl.
CPC .......... *H04L 9/0844* (2013.01); *H04L 9/0819* (2013.01); *H04L 63/0428* (2013.01)

(58) Field of Classification Search
CPC .. H04L 9/0844; H04L 9/0819; H04L 63/0428
USPC ........................................................ 713/171
See application file for complete search history.

(56) References Cited

U.S. PATENT DOCUMENTS

| 9,882,714 B1 * | 1/2018 | Cignetti ................. H04L 9/083 |
| 2019/0288842 A1 * | 9/2019 | Weis ...................... H04L 9/0891 |

FOREIGN PATENT DOCUMENTS

| CN | 111049648 A | 4/2020 |
| EP | 3907961 A1 | 11/2021 |

OTHER PUBLICATIONS

Extended European Search Report for Application No. EP22177607.3 mailed on Nov. 9, 2022, 10 pages.

* cited by examiner

*Primary Examiner* — Jeffrey C Pwu
*Assistant Examiner* — Michael D Anderson
(74) *Attorney, Agent, or Firm* — Harrity & Harrity, LLP

(57) ABSTRACT

A first network device may install a new receive key on a data plane of the first network device, and may provide, to a second network device, a first request to install the new receive key. The first network device may receive a first indication that the new receive key is installed by the second network device, and may install a new transmit key on the data plane of the first network device based on the first indication. The first network device may provide, to the second network device, a second request to install the new transmit key, and may receive a second indication that the new transmit key is installed and that an old receive key is deleted by the second network device. The first network device may delete the old receive key from the data plane of the first network device based on the second indication.

20 Claims, 9 Drawing Sheets

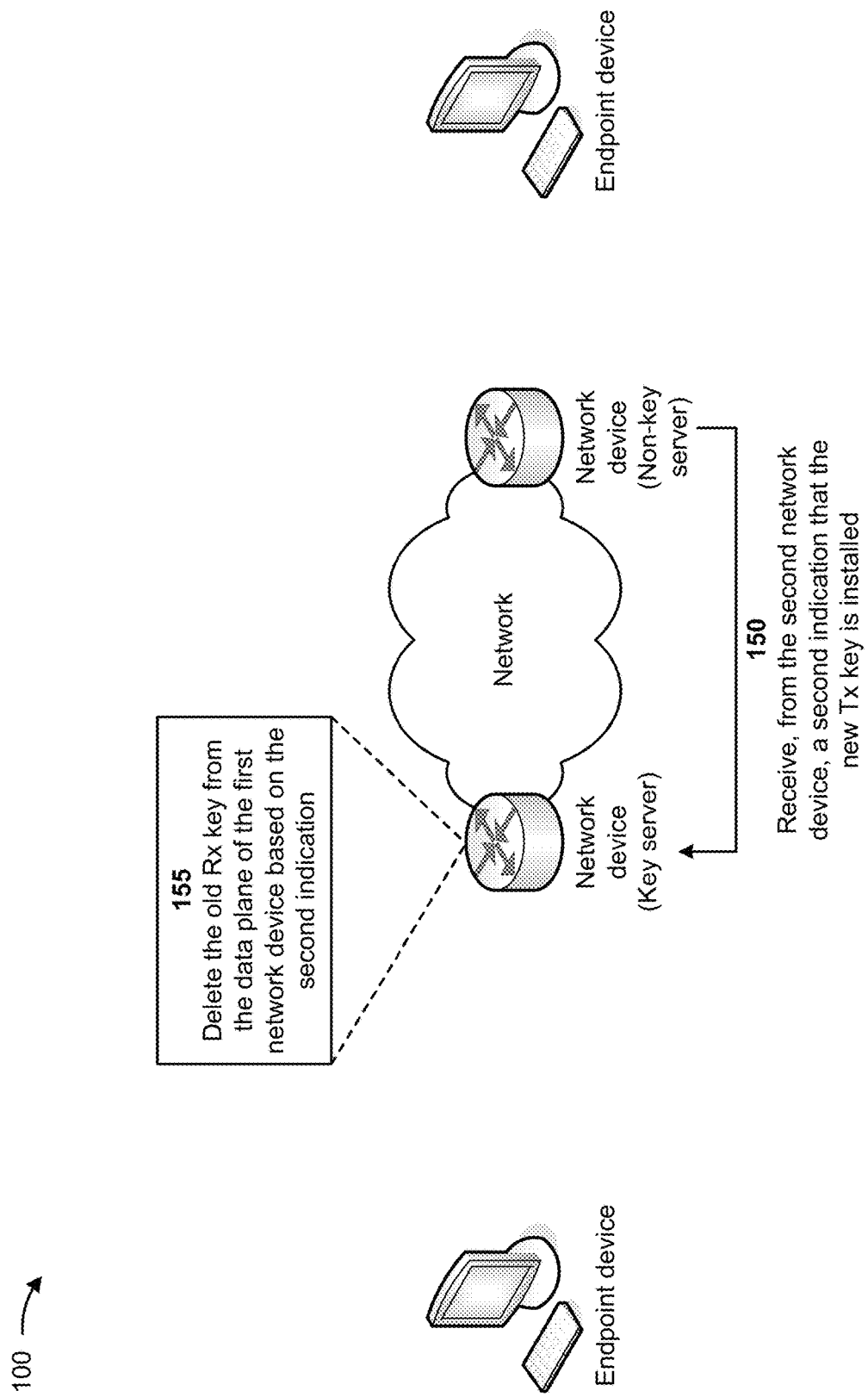

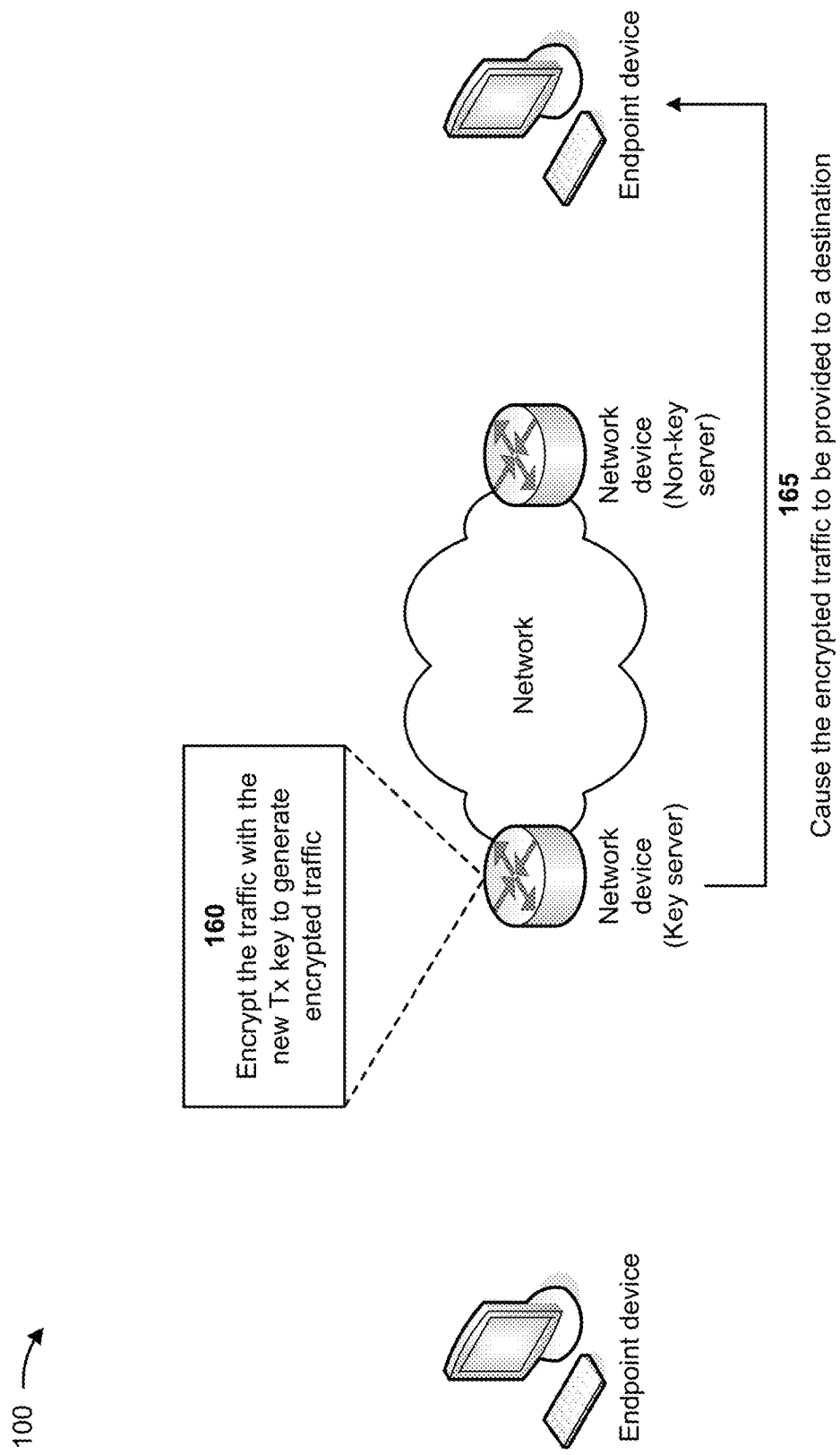

DELETING STALE OR UNUSED KEYS TO GUARANTEE ZERO PACKET LOSS

BACKGROUND

Media access control security (MACsec) provides point-to-point security on Ethernet links. MACsec may be utilized in combination with other security protocols, such as Internet protocol security (IPsec) and secure sockets layer (SSL), to provide end-to-end network security.

SUMMARY

Some implementations described herein relate to a method. The method may include installing a new receive key on a data plane of a first network device, and providing, to a second network device, a first request to install the new receive key. The method may include receiving, from the second network device, a first indication that the new receive key is installed by the second network device, and installing a new transmit key on the data plane of the first network device based on the first indication. The method may include providing, to the second network device, a second request to install the new transmit key, and receiving, from the second network device, a second indication that the new transmit key is installed and that an old receive key is deleted by the second network device. The method may include deleting the old receive key from the data plane of the first network device based on the second indication.

Some implementations described herein relate to a first network device. The first network device may include one or more memories and one or more processors. The one or more processors may be configured to install a new receive key on a data plane of the first network device, and provide, to a second network device, a first request to install the new receive key. The one or more processors may be configured to receive, from the second network device, a first indication that the new receive key is installed by the second network device, and install a new transmit key on the data plane of the first network device based on the first indication. The one or more processors may be configured to provide, to the second network device, a second request to install the new transmit key, and receive, from the second network device, a second indication that the new transmit key is installed and that an old receive key is deleted by the second network device. The one or more processors may be configured to delete the old receive key from the data plane of the first network device based on the second indication, and encrypt traffic with the new transmit key to generate encrypted traffic. The one or more processors may be configured to cause the encrypted traffic to be provided to a destination.

Some implementations described herein relate to a non-transitory computer-readable medium that stores a set of instructions for a first network device. The set of instructions, when executed by one or more processors of the first network device, may cause the first network device to install a new receive key on a data plane of the first network device, and provide, to a second network device, a first request to install the new receive key. The set of instructions, when executed by one or more processors of the first network device, may cause the first network device to receive, from the second network device, a first indication that the new receive key is installed by the second network device, and install a new transmit key on the data plane of the first network device based on the first indication. The set of instructions, when executed by one or more processors of the first network device, may cause the first network device to provide, to the second network device, a second request to install the new transmit key, and receive, from the second network device, a second indication that the new transmit key is installed and that an old receive key is deleted by the second network device. The set of instructions, when executed by one or more processors of the first network device, may cause the first network device to delete the old receive key from the data plane of the first network device based on the second indication, and receive traffic from a source. The set of instructions, when executed by one or more processors of the first network device, may cause the first network device to encrypt the traffic with the new transmit key to generate encrypted traffic, and cause the encrypted traffic to be provided to a destination.

BRIEF DESCRIPTION OF THE DRAWINGS

FIGS. 1A-1E are diagrams of an example associated with deleting stale or unused keys to guarantee zero packet loss.

DETAILED DESCRIPTION

Figure 1A:
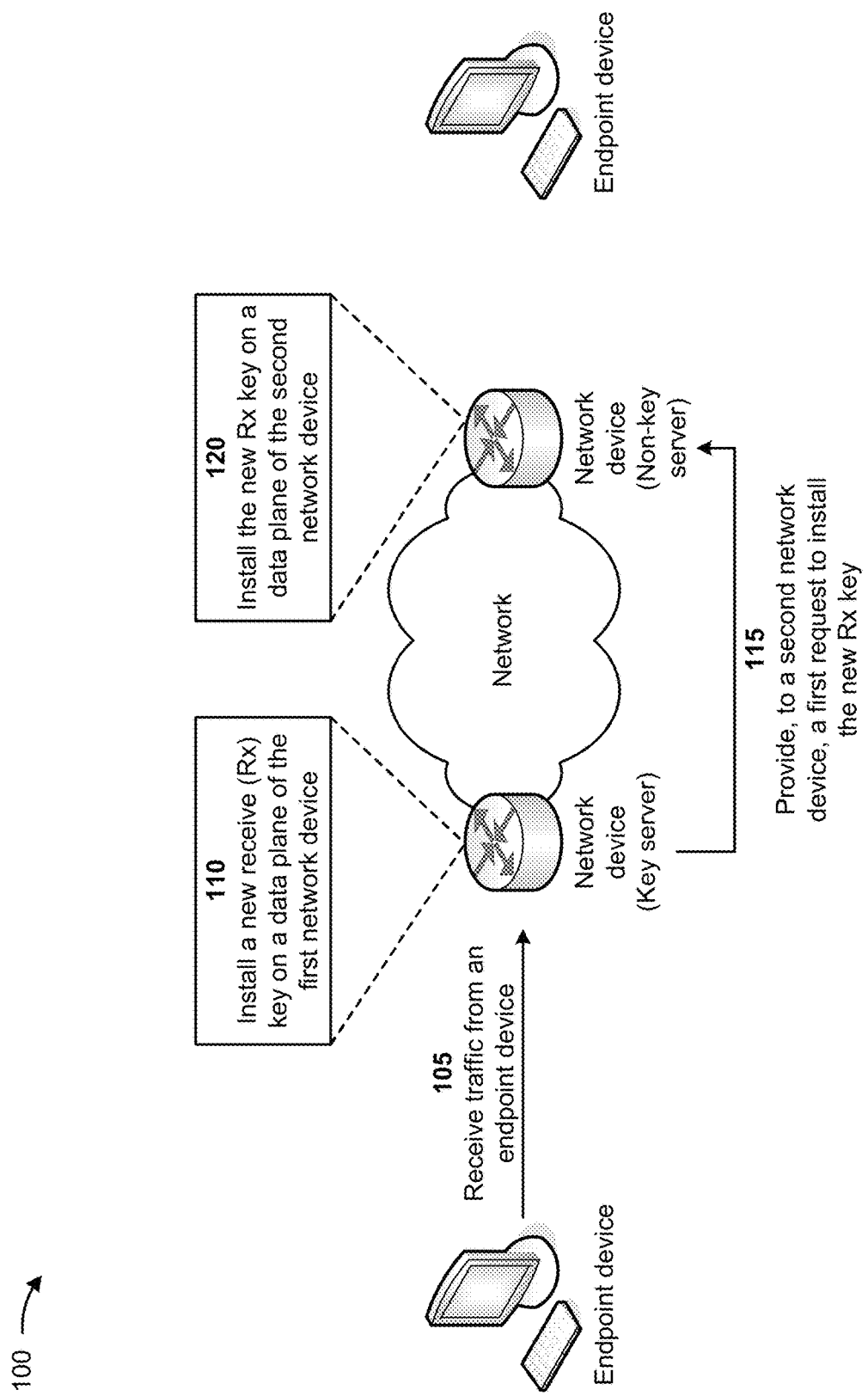

The following detailed description of example implementations refers to the accompanying drawings. The same reference numbers in different drawings may identify the same or similar elements.

In order to achieve hitless key rollover (e.g., switching to new pair of transmit (Tx)/receive (Rx) keys with zero packet loss during key rollover), the Rx keys are installed on all network devices first (e.g., key server network device and non-key server network devices) followed by installation of the Tx keys. In other words, a new Rx key is installed on a key server network device, and then the new Rx key is installed on peer network devices. A new Tx key is installed on the key server network device, and then the new Tx key is installed on the peer network devices. This sequence will ensure that all network devices in a network are ready to receive traffic before the key server network device transmits traffic using the new Tx key.

The Tx/Rx keys are stored in hardware memory registers of a chip (e.g., an application-specific integrated circuit (ASIC) of a network device) that implements the MACsec feature. For a key rollover to be hitless, a current Rx key is kept stored in the hardware memory registers while a new Rx key is being installed on the network device. This ensures that the network device is able to receive and decrypt traffic transmitted by peer network devices using an old Tx key until a new Tx key is installed on the peer network devices. However, since the hardware memory registers are a limited resource, the network device cannot continue to store all previous Rx keys while key rollover events occur since the network device will eventually expend the hardware memory registers and cause a protocol function failure.

Thus, current techniques for achieving hitless key rollover consume computing resources (e.g., processing resources, memory resources, communication resources, and/or the like), networking resources, and/or the like, associated with expending hardware memory registers of network devices caused by storing previous Rx keys, losing traffic based on the expended hardware registers, attempting to recover the lost traffic, providing unsecure traffic over a network, and/or the like.

Some implementations described herein relate to a network device that deletes stale or unused keys to guarantee zero packet loss. For example, a first network device may install a new receive key on a data plane of the first network device, and may provide, to a second network device, a first request to install the new receive key. The first network device may receive, from the second network device, a first indication that the new receive key is installed by the second network device, and may install a new transmit key on the data plane of the first network device based on the first indication. The first network device may provide, to the second network device, a second request to install the new transmit key, and may receive, from the second network device, a second indication that the new transmit key is installed and that an old receive key is deleted by the second network device. The first network device may delete the old receive key from the data plane of the first network device based on the second indication.

In this way, the network device deletes stale or unused keys to guarantee zero packet loss. For example, a control plane of a network device may explicitly send an Rx key delete event for a stale or unused key to a data plane of the network device once the network device determines that all MACsec peer network devices in a network have moved to the new pair of Tx/Rx keys. Once a peer network device installs a new pair of Tx/Rx keys, the peer network device may update corresponding fields in control packets, thus allowing the key server network device to determine that the new pair of Tx/Rx keys have been installed on the peer network device. The key server network device may then initiate a delete of an old Rx key on all peer network devices in the network. Thus, the network device conserves computing resources, networking resources, and/or the like that would otherwise have been consumed by expending hardware memory registers of network devices caused by storing previous Rx keys, losing traffic based on the expended hardware registers, attempting to recover the lost traffic, providing unsecure traffic over a network, and/or the like.

FIGS. 1A-1E are diagrams of an example 100 associated with deleting stale or unused keys to guarantee zero packet loss. As shown in FIGS. 1A-1E, example 100 includes one or more endpoint devices and a network with a plurality of network devices. Further details of the endpoint devices, the network, and the network devices are provided elsewhere herein.

As shown in FIG. 1A, and by reference number 105, a first network device may receive traffic from an endpoint device. For example, the endpoint device may continuously generate the traffic, may periodically generate the traffic, and/or the like, and may provide the traffic to the network device. Thus, the first network device may continuously receive the traffic from the endpoint device, may periodically receive the traffic from the endpoint device, may receive the traffic from the endpoint device based on requesting the traffic from the endpoint device, and/or the like.

As further shown in FIG. 1A, and by reference number 110, the first network device may install a new receive (Rx) key on a data plane of the first network device. For example, the first network device may be a key server and the second network device may be a peer or non-key server. A pair of old MACsec keys (e.g., an old Rx key and an old Tx key) may be installed on the first network device and the second network device. The first network device may be configured to install a pair of new MACsec keys (e.g., the new Rx key and a new Tx key). The first network device may include software (e.g., a daemon) that causes the first network device to install the new Rx key on the data plane of the first network device. In some implementations, the daemon of the first network device may cause the first network device to store the new Rx key in hardware memory registers of a chip (e.g., an ASIC of the first network device) that implements the MACsec feature.

In some implementations, the pair of new MACsec keys may be preconfigured on the first network device, may be automatically generated by the first network device, may be received from another device (e.g., a network administrative device), and/or the like. In some implementations, the first network device may cause another device to generate the pair of new MACsec keys. The first network may be triggered to replace the pair of old MACsec keys with the pair of new MACsec keys based on, for example, a last time the key pair was updated, receiving, from another device (e.g., a network administrative device), an indication to update the key pair, after a predetermined time period, and/or the like.

As further shown in FIG. 1A, and by reference number 115, the first network device may provide, to a second network device, a first request to install the new Rx key. For example, the daemon of the first network device may cause the first network device to generate the first request to install the new Rx key. In some implementations, the first request may include a MACsec key agreement (MKA) control message exchanged between the daemon of the first network device and daemons executing on peer network devices, such as the second network device. The first request may include the new Rx key and instructions requesting the second network device to install the new Rx key on a data plane of the second network device. The first network device may provide the first request to the second network device, and the second network device may receive the first request.

As further shown in FIG. 1A, and by reference number 120, the second network device may install the new Rx key on a data plane of the second network device. For example, the second network device may receive the first request to install the new Rx key (e.g., which includes the new Rx key), and may install the new Rx key on the data plane of the second network device based on the first request. In some implementations, the second network device may include software (e.g., a daemon) that causes the second network device to install the new Rx key on the data plane of the second network device based on the first request. In some implementations, the daemon of the second network device may cause the second network device to store the new Rx key in hardware memory registers of a chip (e.g., an ASIC of the second network device) that implements the MACsec feature.

Figure 1B:
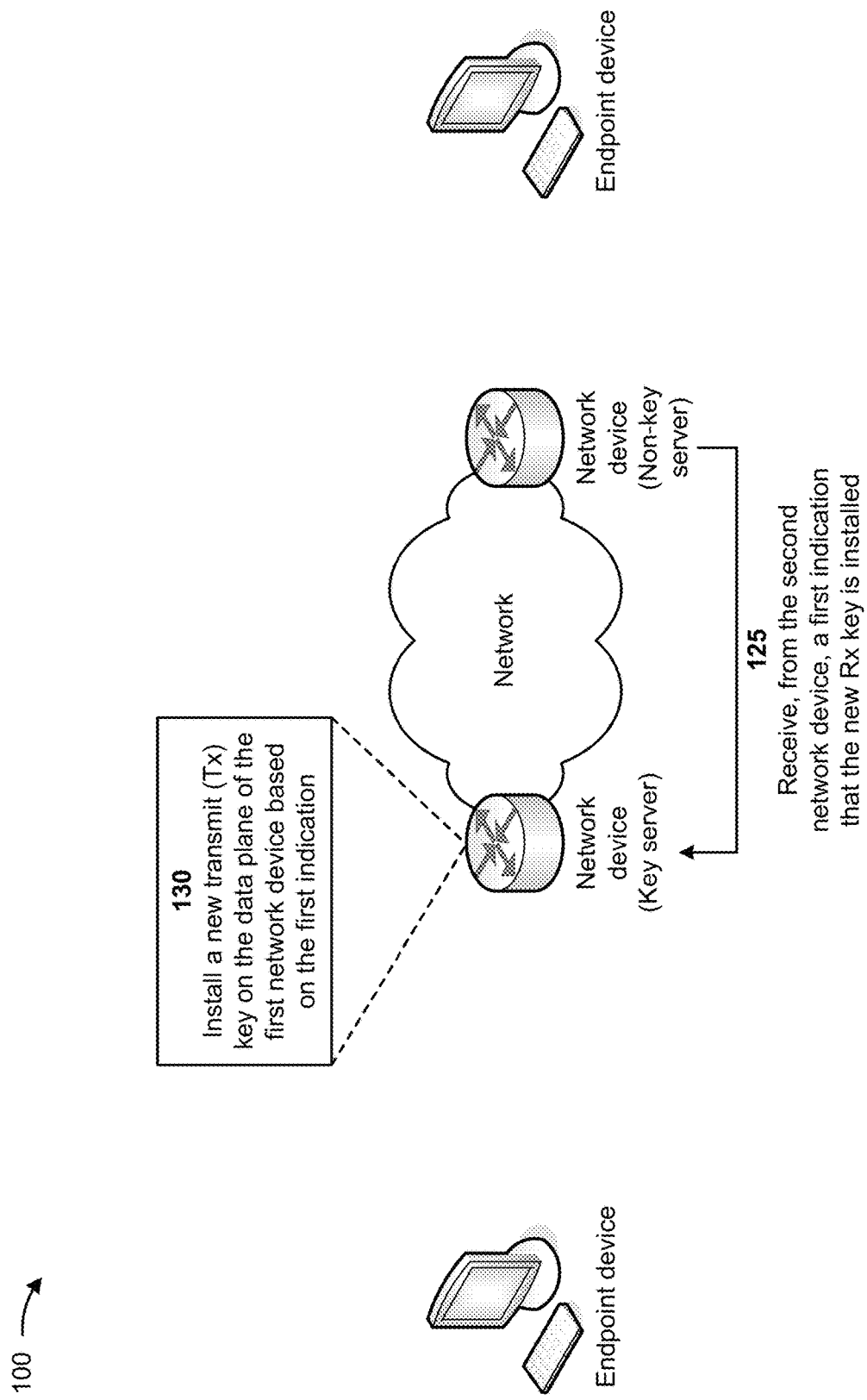

As shown in FIG. 1B, and by reference number 125, the first network device may receive, from the second network device, a first indication that the new Rx key is installed. For example, after installing the new Rx key on the data plane, the daemon of the second network device may cause the second network device to generate the first indication indicating that the new Rx key is installed on the data plane of the second network device. In some implementations, the first indication may include an MKA control message exchanged between the daemon on the second network device and the daemon of the first network device. The first indication may include information indicating that the second network device installed the new Rx key on a data plane of the second network device. The second network device may provide the first indication to the first network device, and the first network device may receive the first indication.

As further shown in FIG. 1B, and by reference number 130, the first network device may install a new transmit (Tx) key on the data plane of the first network device based on the first indication. For example, after receiving the first indication, the first network device may install the new Tx key on the data plane of the first network device. In some implementations, the daemon of the first network device may cause the first network device to install the new Tx key on the data plane of the first network device. In some implementations, the daemon of the first network device may cause the first network device to store the new Tx key in the hardware memory registers of the chip (e.g., the ASIC of the first network device) that implements the MACsec feature.

Figure 1C:
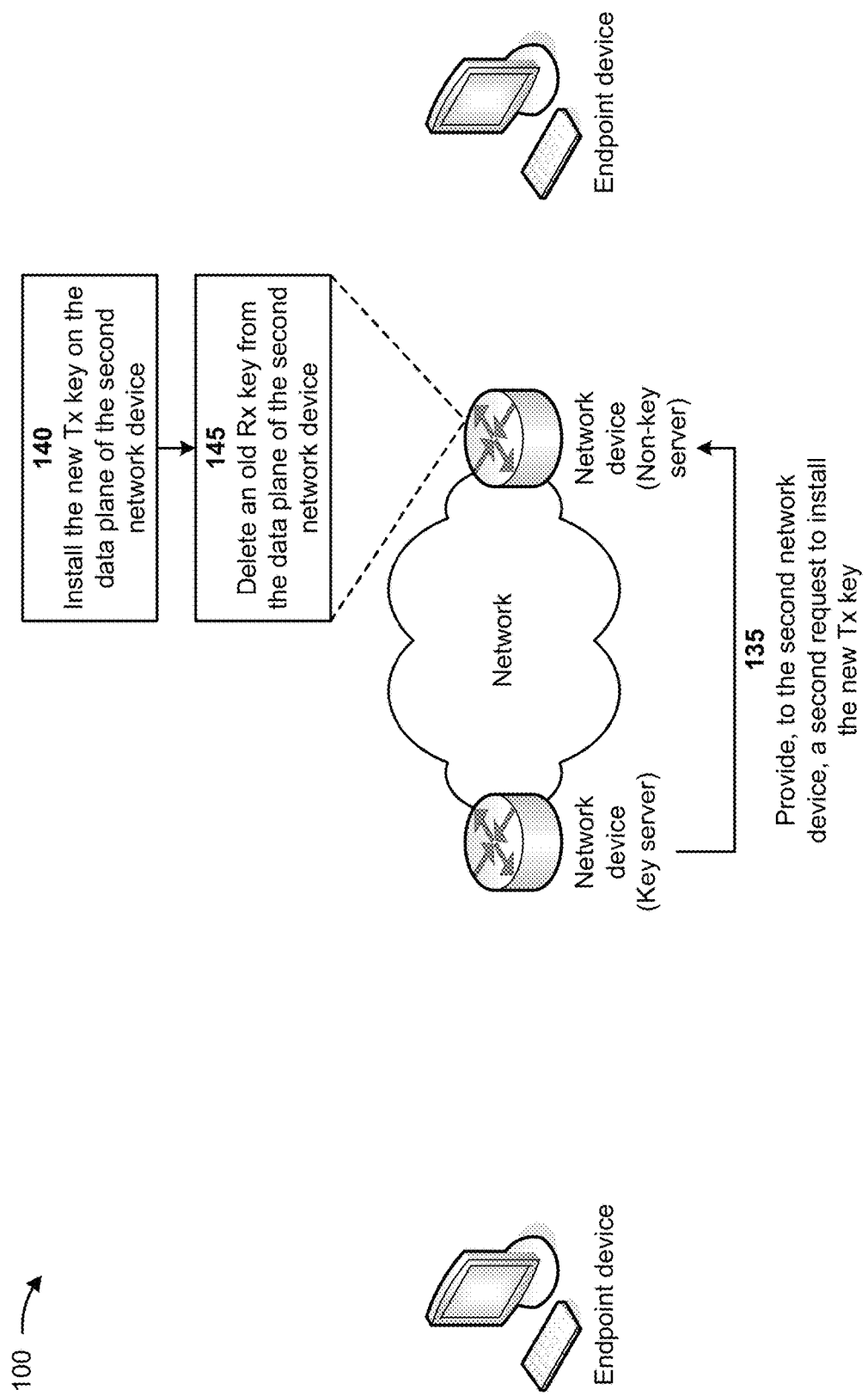

As shown in FIG. 1C, and by reference number 135, the first network device may provide, to the second network device, a second request to install the new Tx key. For example, the daemon of the first network device may cause the first network device to generate the second request to install the new Tx key. In some implementations, the second request may include an MKA control message exchanged between the daemon on the first network device and daemons executing on peers network devices, such as the second network device. The second request may include the new Tx key and instructions requesting the second network device to install the new Tx key on the data plane of the second network device. The first network device may provide the second request to the second network device, and the second network device may receive the second request.

As further shown in FIG. 1C, and by reference number 140, the second network device may install the new Tx key on the data plane of the second network device. For example, the second network device may receive the second request to install the new Tx key (e.g., which includes the new Tx key), and may install the new Tx key on the data plane of the second network device based on the second request. In some implementations, the daemon of the second network device may cause the second network device to install the new Tx key on the data plane of the second network device based on the second request. In some implementations, the daemon of the second network device may cause the second network device to store the new Tx key in the hardware memory registers of the chip (e.g., the ASIC of the second network device) that implements the MACsec feature.

As further shown in FIG. 1C, and by reference number 145, the second network device may delete an old Rx key from the data plane of the second network device. For example, the daemon of the second network device may cause the second network device to delete the old Rx key from the data plane of the second network device based on the second request. In some implementations, the daemon of the second network device may cause, based on the second request, the second network device to remove the old Rx key from the hardware memory registers of the chip (e.g., the ASIC of the second network device) that implements the MACsec feature. In some implementations, the daemon of the second network device may cause a control plane of the second network device to provide a deletion request to the data plane of the second network device, and may cause the data plane of the second network device to delete the old receive key based on the deletion request.

As shown in FIG. 1D, and by reference number 150, the first network device may receive, from the second network device, a second indication that the new Tx key is installed. For example, after installing the new Tx key on the data plane, the daemon of the second network device may cause the second network device to generate the second indication that the new Tx key is installed. In some implementations, the second indication may include an MKA control message exchanged between the daemon on the second network device and the daemon of the first network device. The second indication may include information indicating that the new Tx key is installed on the data plane of the second network device and indicating that the old Rx key is deleted from the data plane of the second network device. The second network device may provide the second indication to the first network device, and the first network device may receive the second indication.

As further shown in FIG. 1D, and by reference number 155, the first network device may delete the old Rx key from the data plane of the first network device based on the second indication. For example, the daemon of the first network device may cause the first network device to delete the old Rx key from the data plane of the first network device based on the second indication. In some implementations, the daemon of the first network device may cause, based on the second indication, the first network device to remove the old Rx key from the hardware memory registers of the chip (e.g., the ASIC of the second network device) that implements the MACsec feature. In some implementations, the daemon of the first network device may cause a control plane of the first network device to provide a deletion request to the data plane of the first network device, and may cause the data plane of the first network device to delete the old receive key based on the deletion request. At this point, the key rollover may be complete and the new key pair (e.g., the new Rx key and the new Tx key) may be programmed on the data planes of the first network device and the second network device.

As shown in FIG. 1E, and by reference number 160, the first network device may encrypt the traffic with the new Tx key to generate encrypted traffic. For example, once the key rollover is complete, the first network device may utilize the new Tx key to encrypt the traffic and to generate the encrypted traffic. In some implementations, the first network device may generate a symmetric key intended for symmetric key cryptography, and may utilize the new Tx key to encrypt the newly generated symmetric key and the traffic. The first network device may send the encrypted symmetric key and the encrypted traffic over an insecure channel to the destination, via the second network device. The second network device may decrypt the encrypted symmetric key and the encrypted traffic using the new Rx key (e.g., which pairs with the new Tx key). With the first network device and the second network device both having the same symmetric key, the first network device and the second network device may safely utilize symmetric key encryption to communicate over otherwise-insecure channels.

As further shown in FIG. 1E, and by reference number 165, the first network device may cause the encrypted traffic to be provided to a destination. For example, the first network device may provide the encrypted traffic to the second network device. The second network device may utilize the new Rx key to decrypt the encrypted traffic and to generate the traffic. If the second network device is connected to the destination (e.g., an endpoint device), the second network device may forward the traffic to the destination. If the second network device is not connected to the destination, the second network device may provide the encrypted traffic to another peer network device that includes the new Rx key for decrypting the encrypted traffic.

In this way, the network device deletes stale or unused keys to guarantee zero packet loss. For example, a control plane of a network device may explicitly send an Rx key delete event for a stale or unused key to a data plane of the network device once the network device determines that all MACsec peer network devices in a network have moved to new pair of Tx/Rx keys. Once a peer network device installs a new pair of Tx/Rx keys, the peer network device may update corresponding fields in control packets, thus allowing the key server network device to determine that the new pair of Tx/Rx keys have been installed on the peer network device. The key server network device may then initiate a delete of an old Rx key on all peer network devices in the network. Thus, the network device conserves computing resources, networking resources, and/or the like that would otherwise have been consumed by expending hardware memory registers of network devices caused by storing previous Rx keys, losing traffic based on the expended hardware registers, attempting to recover the lost traffic, providing unsecure traffic over a network, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
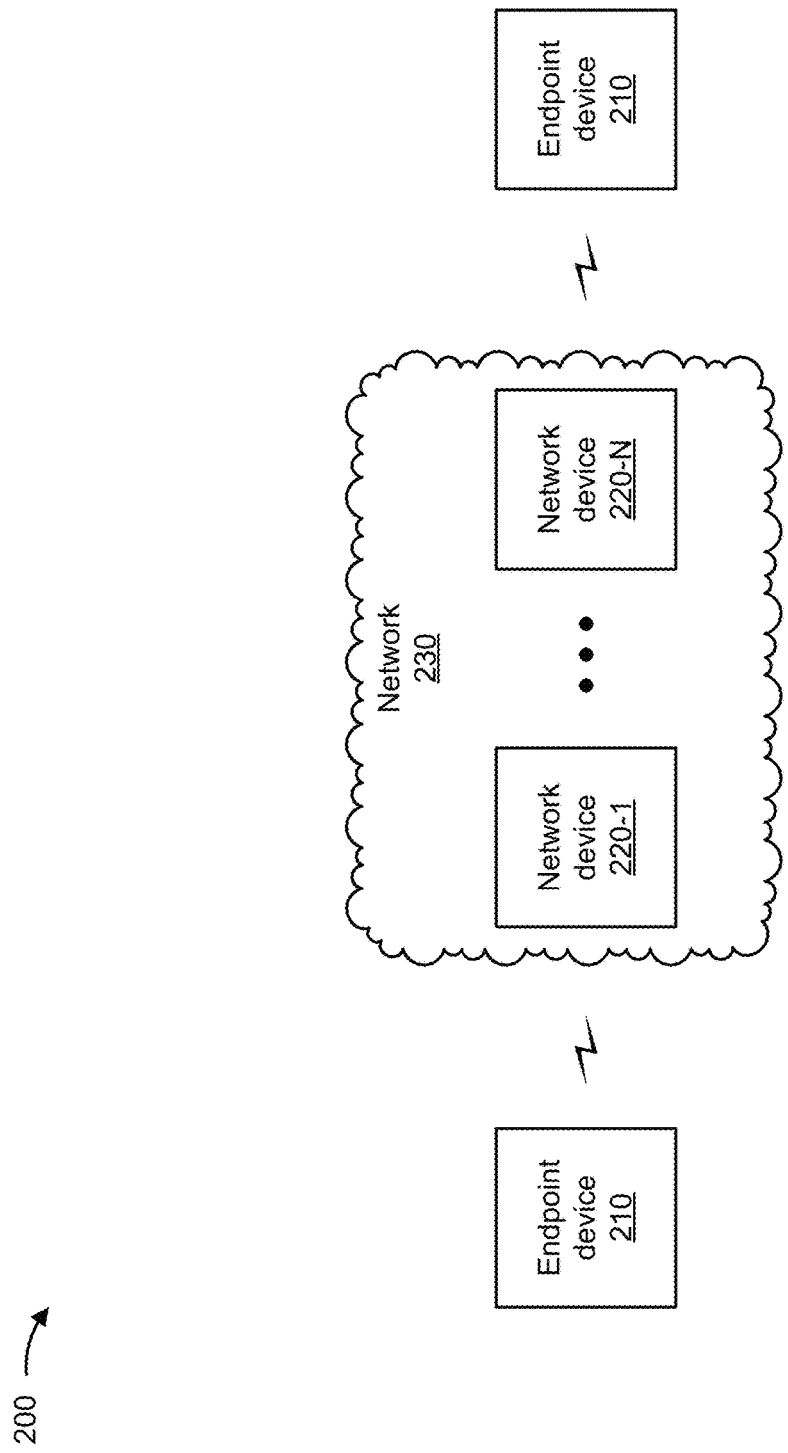
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), and a network 230. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to other endpoint devices 210, via the network 230 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 230.

The network 230 includes one or more wired and/or wireless networks. For example, the network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
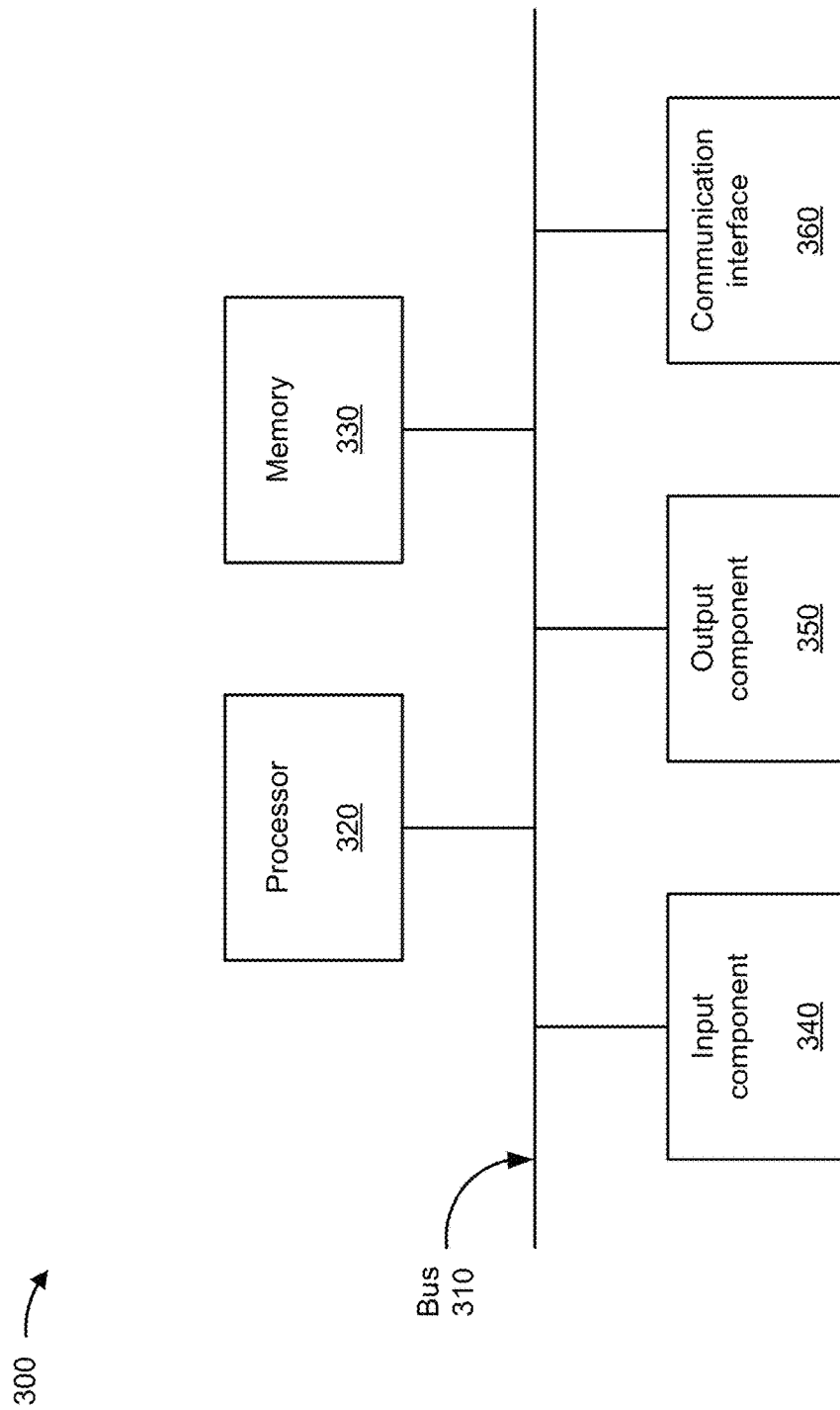
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210 and/or the network device 220. In some implementations, the endpoint device 210 and/or the network device 220 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
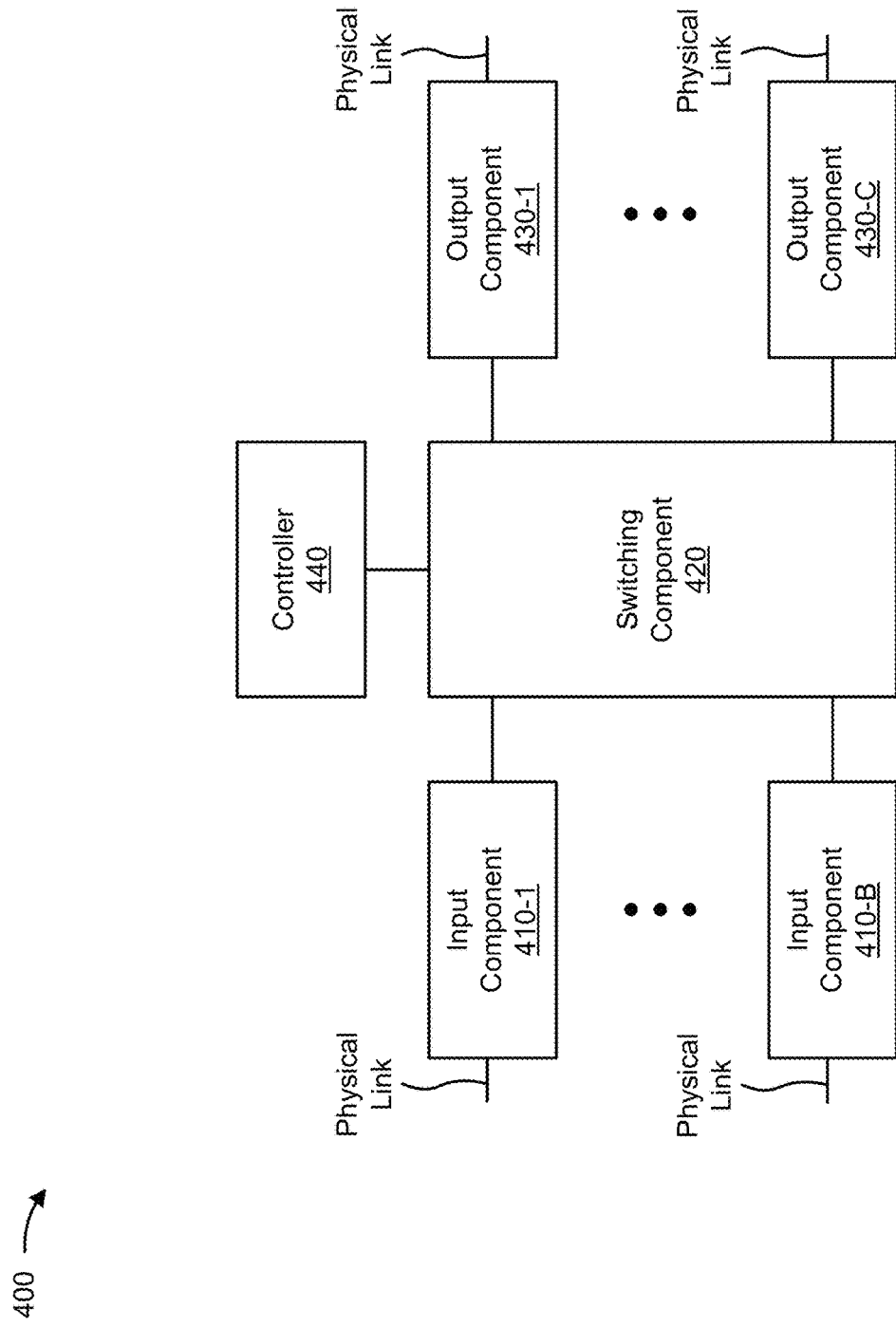

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
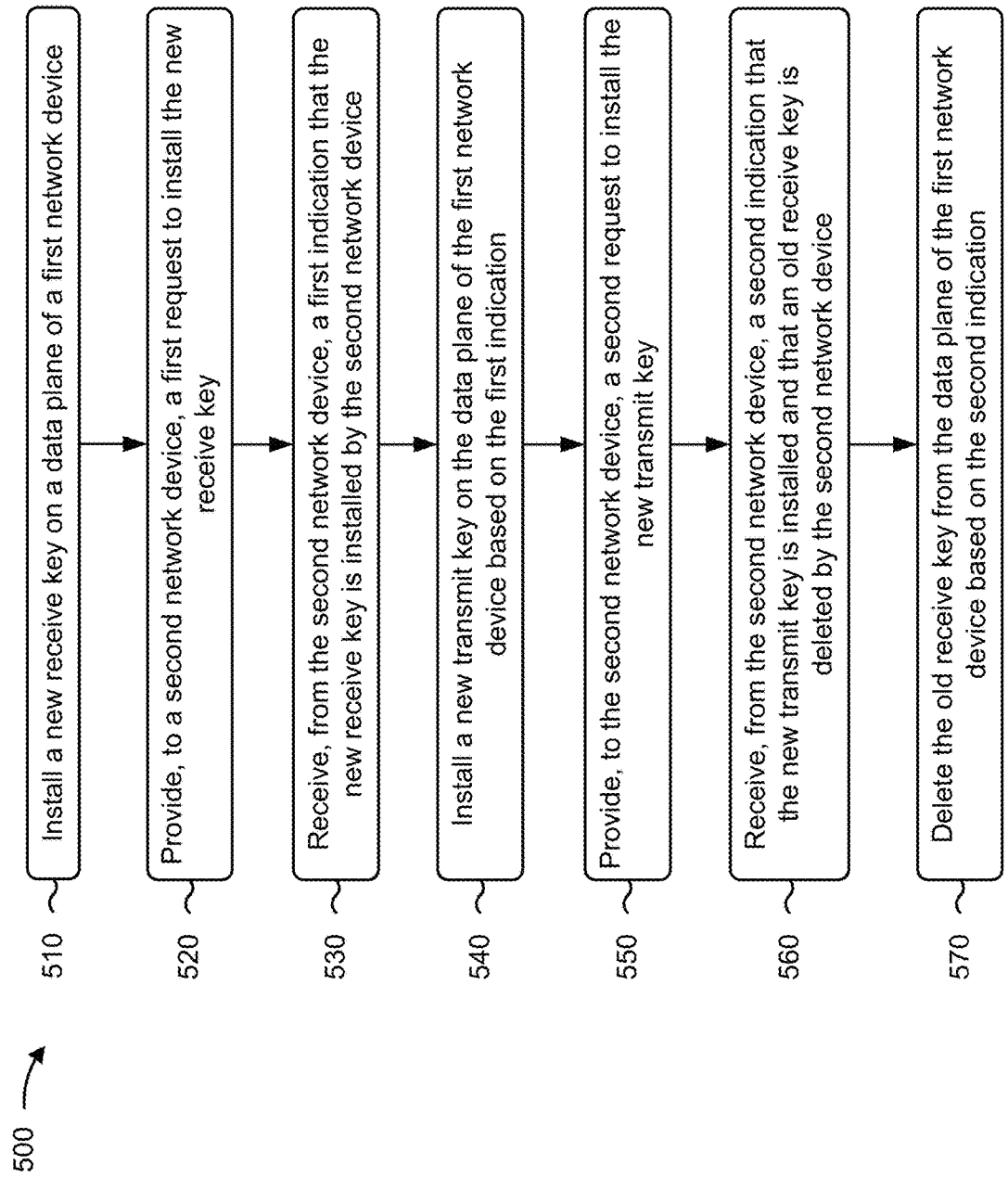
FIG. 5 is a flowchart of an example process for deleting stale or unused keys to guarantee zero packet loss.

FIG. 5 is a flowchart of an example process 500 for deleting stale or unused keys to guarantee zero packet loss. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include installing a new receive key on a data plane of the first network device (block 510). For example, the first network device may install a new receive key on a data plane of the first network device, as described above.

As further shown in FIG. 5, process 500 may include providing, to a second network device, a first request to install the new receive key (block 520). For example, the first network device may provide, to a second network device, a first request to install the new receive key, as described above. In some implementations, the second network device is to decrypt the encrypted traffic with the new receive key. In some implementations, the first network device is a key server and the second network device is a non-key server. In some implementations, providing, to the second network device, the first request to install the new receive key includes providing the first request to install the new receive key to the second network device via a MACsec key agreement control message.

As further shown in FIG. 5, process 500 may include receiving, from the second network device, a first indication that the new receive key is installed by the second network device (block 530). For example, the first network device may receive, from the second network device, a first indication that the new receive key is installed by the second network device, as described above.

As further shown in FIG. 5, process 500 may include installing a new transmit key on the data plane of the first network device based on the first indication (block 540). For example, the first network device may install a new transmit key on the data plane of the first network device based on the first indication, as described above.

As further shown in FIG. 5, process 500 may include providing, to the second network device, a second request to install the new transmit key (block 550). For example, the first network device may provide, to the second network device, a second request to install the new transmit key, as described above. In some implementations, providing, to the second network device, the second request to install the new transmit key includes providing the second request to install the new transmit key to the second network device via a MACsec key agreement control message.

As further shown in FIG. 5, process 500 may include receiving, from the second network device, a second indication that the new transmit key is installed and that an old receive key is deleted by the second network device (block 560). For example, the first network device may receive, from the second network device, a second indication that the new transmit key is installed and that an old receive key is deleted by the second network device, as described above. In some implementations, each of the first indication and the second indication is received via a MACsec key agreement control message generated by the second network device. In some implementations, the second network device is to cause a control plane of the second network device to provide a deletion request to a data plane of the second network device, and to cause the data plane of the second network device to delete the old receive key based on the deletion request. In some implementations, each of the new receive key, the new transmit key, and the old receive key is a MACsec key.

As further shown in FIG. 5, process 500 may include deleting the old receive key from the data plane of the first network device based on the second indication (block 570). For example, the first network device may delete the old receive key from the data plane of the first network device based on the second indication, as described above. In some implementations, deleting the old receive key from the data plane of the first network device based on the second indication includes causing a control plane of the first network device to provide a deletion request to the data plane of the first network device, and causing the data plane of the first network device to delete the old receive key based on the deletion request. In some implementations, the old receive key is deleted to achieve zero packet loss during a key rollover. In some implementations, the first network device includes a daemon causes the first network device to install the new receive key, provide the first request, receive the first indication, install the new transmit key, provide the second request, receive the second indication, or delete the old receive key.

In some implementations, process 500 includes receiving traffic from a source, encrypting the traffic with the new transmit key to generate encrypted traffic, and causing the encrypted traffic to be provided to a destination.

In some implementations, process 500 includes storing the new receive key in a hardware memory register of the first network device after installing the new receive key on the data plane of the first network device, and storing the new transmit key in the hardware memory register of the first network device after installing the new transmit key on the data plane of the first network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  installing, by a first network device, a new receive key on a data plane of the first network device;
  providing, by the first network device and to a second network device, a first request to install the new receive key;
  receiving, by the first network device and from the second network device, a first indication that the new receive key is installed by the second network device;
  installing, by the first network device, a new transmit key on the data plane of the first network device based on the first indication;
  providing, by the first network device and to the second network device, a second request to install the new transmit key;
  receiving, by the first network device and from the second network device, a second indication that the new transmit key is installed and that an old receive key is deleted by the second network device; and
  deleting, by the first network device, the old receive key from the data plane of the first network device to achieve zero packet loss during a key rollover based on the second indication.

2. The method of claim 1, further comprising:
  receiving traffic from a source;
  encrypting the traffic with the new transmit key to generate encrypted traffic; and
  causing the encrypted traffic to be provided to a destination.

3. The method of claim 2, wherein the second network device is to decrypt the encrypted traffic with the new receive key.

4. The method of claim 1, wherein the old receive key is deleted to achieve zero packet loss during a key rollover.

5. The method of claim 1, wherein each of the first indication and the second indication is received via a media access control security key agreement control message generated by the second network device.

6. The method of claim 1, wherein the first network device is a key server and the second network device is a non-key server.

7. The method of claim 1, further comprising:
  storing the new receive key in a hardware memory register of the first network device after installing the new receive key on the data plane of the first network device; and
  storing the new transmit key in the hardware memory register of the first network device after installing the new transmit key on the data plane of the first network device.

8. A first network device, comprising:
  one or more memories; and
  one or more processors to:
    install a new receive key on a data plane of the first network device;
    provide, to a second network device, a first request to install the new receive key;
    receive, from the second network device, a first indication that the new receive key is installed by the second network device;
    install a new transmit key on the data plane of the first network device based on the first indication;

provide, to the second network device, a second request to install the new transmit key;
receive, from the second network device, a second indication that the new transmit key is installed and that an old receive key is deleted by the second network device;
delete the old receive key from the data plane of the first network device to achieve zero packet loss during a key rollover based on the second indication;
encrypt traffic with the new transmit key to generate encrypted traffic; and
cause the encrypted traffic to be provided to a destination.

9. The first network device of claim 8, wherein the one or more processors, to delete the old receive key from the data plane of the first network device based on the second indication, are to:
cause a control plane of the first network device to provide a deletion request to the data plane of the first network device; and
cause the data plane of the first network device to delete the old receive key based on the deletion request.

10. The first network device of claim 8, wherein the second network device is to cause a control plane of the second network device to provide a deletion request to a data plane of the second network device, and to cause the data plane of the second network device to delete the old receive key based on the deletion request.

11. The first network device of claim 8, wherein each of the new receive key, the new transmit key, and the old receive key is a media access control security key.

12. The first network device of claim 8, wherein the one or more processors, to provide, to the second network device, the first request to install the new receive key, are to:
provide the first request to install the new receive key to the second network device via a media access control security key agreement control message.

13. The first network device of claim 8, wherein the one or more processors, to provide, to the second network device, the second request to install the new transmit key, are to:
provide the second request to install the new transmit key to the second network device via a media access control security key agreement control message.

14. The first network device of claim 8, wherein the first network device includes a daemon that causes the first network device to install the new receive key, provide the first request, receive the first indication, install the new transmit key, provide the second request, receive the second indication, or delete the old receive key.

15. A non-transitory computer-readable medium storing a set of instructions, the set of instructions comprising:
one or more instructions that, when executed by one or more processors of a first network device, cause the first network device to:
install a new receive key on a data plane of the first network device;
provide, to a second network device, a first request to install the new receive key;
receive, from the second network device, a first indication that the new receive key is installed by the second network device;
install a new transmit key on the data plane of the first network device based on the first indication;
provide, to the second network device, a second request to install the new transmit key;
receive, from the second network device, a second indication that the new transmit key is installed and that an old receive key is deleted by the second network device;
delete the old receive key from the data plane of the first network device to achieve zero packet loss during a key rollover based on the second indication;
receive traffic from a source;
encrypt the traffic with the new transmit key to generate encrypted traffic; and
cause the encrypted traffic to be provided to a destination.

16. The non-transitory computer-readable medium of claim 15, wherein each of the first indication and the second indication is received via a media access control security key agreement control message generated by the second network device.

17. The non-transitory computer-readable medium of claim 15, wherein the one or more instructions further cause the first network device to:
store the new receive key in a hardware memory register of the first network device after installing the new receive key on the data plane of the first network device; and
store the new transmit key in the hardware memory register of the first network device after installing the new transmit key on the data plane of the first network device.

18. The non-transitory computer-readable medium of claim 15, wherein the one or more instructions, that cause the first network device to delete the old receive key from the data plane of the first network device based on the second indication, cause the first network device to:
cause a control plane of the first network device to provide a deletion request to the data plane of the first network device; and
cause the data plane of the first network device to delete the old receive key based on the deletion request.

19. The non-transitory computer-readable medium of claim 15, wherein the one or more instructions, that cause the first network device to provide, to the second network device, the first request to install the new receive key, cause the first network device to:
provide the first request to install the new receive key to the second network device via a media access control security key agreement control message.

20. The non-transitory computer-readable medium of claim 15, wherein the one or more instructions, that cause the first network device to provide, to the second network device, the second request to install the new transmit key, cause the first network device to:
provide the second request to install the new transmit key to the second network device via a media access control security key agreement control message.

* * * * *